United States Patent [19]

Kosaka et al.

[11] Patent Number: 4,776,020
[45] Date of Patent: Oct. 4, 1988

[54] DATA SEARCHING APPARATUS BY FEATURE PATTERN

[75] Inventors: Michitaka Kosaka, Sagamihara; Shoji Miyamoto, Kawasaki, both of Japan

[73] Assignee: Hitachi, Ltd., Tokyo, Japan

[21] Appl. No.: 695,236

[22] Filed: Jan. 28, 1985

[30] Foreign Application Priority Data

Jan. 30, 1984 [JP] Japan ................................ 59-13458

[51] Int. Cl.$^4$ ............................................. G06K 9/00
[52] U.S. Cl. ......................................... 382/1; 382/10; 382/16; 382/36; 382/48
[58] Field of Search ..................... 382/1, 9, 48, 61, 18, 382/19, 34, 37, 38, 21, 23, 25, 10, 13, 16, 27, 33, 36

[56] References Cited

U.S. PATENT DOCUMENTS

| | | |
|---|---|---|
| T966,011 | 1/1978 | Howard . |
| 3,568,155 | 3/1971 | Abraham et al. .................. 364/900 |
| 3,603,930 | 9/1971 | Britt ...................................... 382/19 |
| 4,083,035 | 4/1978 | Riganati et al. ...................... 382/27 |
| 4,115,806 | 9/1978 | Morton ................................ 382/23 |
| 4,451,901 | 5/1984 | Wolfe et al. ........................ 364/900 |
| 4,466,063 | 8/1984 | Segarra et al. ..................... 364/200 |
| 4,541,115 | 9/1985 | Werth .................................. 382/23 |
| 4,543,660 | 9/1985 | Maeda ................................ 382/36 |
| 4,555,803 | 11/1985 | Hirose ................................ 382/61 |

Primary Examiner—Leo H. Boudreau
Assistant Examiner—Jose L. Couso
Attorney, Agent, or Firm—Antonelli, Terry & Wands

[57] ABSTRACT

An apparatus for searching data by feature patterns comprises a plurality of processors operating independent of one another for recognizing individual feature patterns of plural input pattern data, a large-capacity file accesing unit arranged to use data constituted by arrays of results of recognitions outputted from the processors as addresses, and a large-capacity file for storing data associated with a large number of input patterns, respectively, at locations of the addresses corresponding to the feature patterns of the input pattern data, respectively. An apparatus for searching data on the basis of feature pattern comprises a plurality of processors of which at least one is activated in response to the results of the processings performed by the other processors which operate independent of one another for recognizing individual feature patterns of input pattern data, respectively, devices for outputting the results of the processings performed by the other processors to the one processor, controller for controlling the activation of the one processor on the basis of the outputted results of the processings, and a large-capacity file arranged to use data constituted by arrays of the results of recognitions outputted from the plural processors directly as the addresses.

6 Claims, 3 Drawing Sheets

DATA SEARCHING APPARATUS BY FEATURE PATTERN

BACKGROUND OF THE INVENTION

1. Field of the Invention

The present invention relates to an apparatus for searching data from a large-capacity file on the basis of pattern features for matching or correlating and/or to identify pattern data such as finger print, seal, constellation or the like pattern data.

2. Description of the Prior Art

In the field of the apparatus of the type mentioned above, there exists a great demand for reducing to a possible minimum the time taken for recognizing the feature of a pattern to be examined as well as the time required for searching the data corresponding to the recognized feature from the large-capacity file.

In a conventional method of matching or correlating a finger print, seal or signature or the like, the image or the like pattern of the object to be correlated is searched with the aid of a registered or estimated identification number or the like, wherein the searched or retrieved image is correlated with the image to be examined in one-to-one correspondence. Difficulty is encountered in the searching and correlation when data such as the identification number is not available. In connection with the correlation of the constellations, there is developed a method of sequentially checking the whole sky as to the presence of the constellation having the feature pattern corresponding to that of an input constellation to be examined (Refer to T. Tanabe et al's article "Identification of Fixed Stars by Stellar Image Data" of a lecture collection at second congress concerning the attitude control, published by The Institute of Space and Astronautical Science, Feb. 24, 1983). This method is also disadvantageous in that an enormous time is required for the processing.

SUMMARY OF THE INVENTION

An object of the present invention is to provide an apparatus for searching relevant data from a large-capacity file on the basis of the very pattern data to be examined (e.g. to be correlated or identified), which apparatus enjoys an enhanced searching efficiency and a significant reduction in time required for the processings.

According to a first aspect of the invention, the processings for recognizing individual feature patterns are performed simultaneously in parallel, wherein the processings which can not be performed independently are sequentially executed at as high a speed as possible by adopting a so-called data-driven type control, to thereby reduce the time taken for executing the processings. According to another aspect of the invention, arrays of data resulting from the feature pattern recognizing processings are straightforwardly used as the addresses for making access to the large-capacity file, to thereby carry out the searching at an increased speed.

DESCRIPTION OF THE PREFERRED EMBODIMENTS

Figure 1:
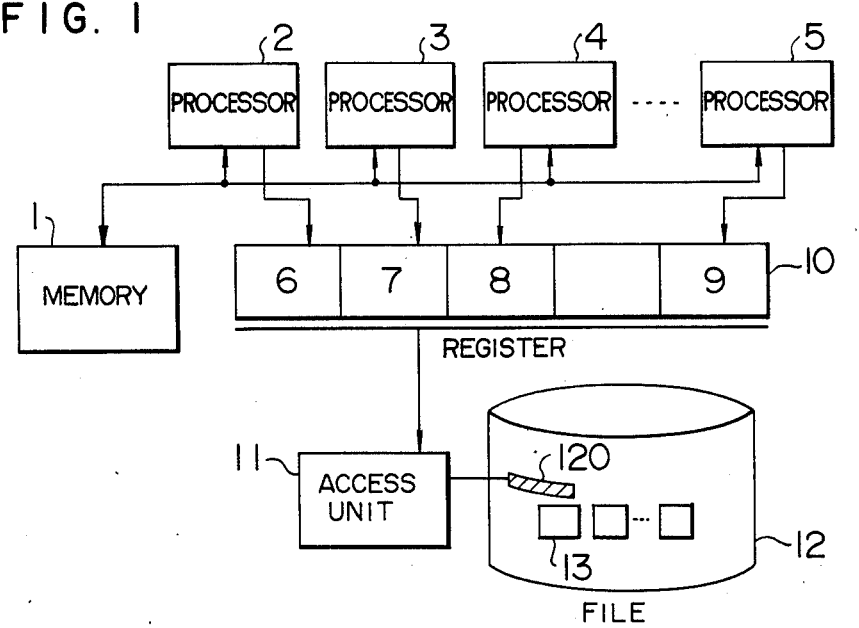
FIG. 1 is a block diagram showing a general arrangement of the data searching apparatus according to an embodiment of the invention.

FIG. 1 shows in a block diagram a data searching apparatus according to an embodiment of the present invention which is so arranged that various pattern recognition processings can be performed independent of one another. Referring to the figure, a storage or memory 1 stores therein images or patterns to be examined. A plurality of processors 2, 3, 4 and 5 are capable of making access to the memory 1 independent of one another for performing respective pattern recognition processings, wherein each of the processors is imparted with the capability or function to recognize a predetermined feature pattern. For example, the processor 2 is destined to serve for determining the number of stars, while the processor 3 is adapted to examine the stellar magnitudes. Bit patterns representing the results of the recognitions issued by the individual processors are written in a register 10 at previously allocated locations 6, 7, 8 and 9, respectively. An access unit 11 makes use of the contents of the register 10 as the address information for making access to a large-capacity file 12.

Figure 2:
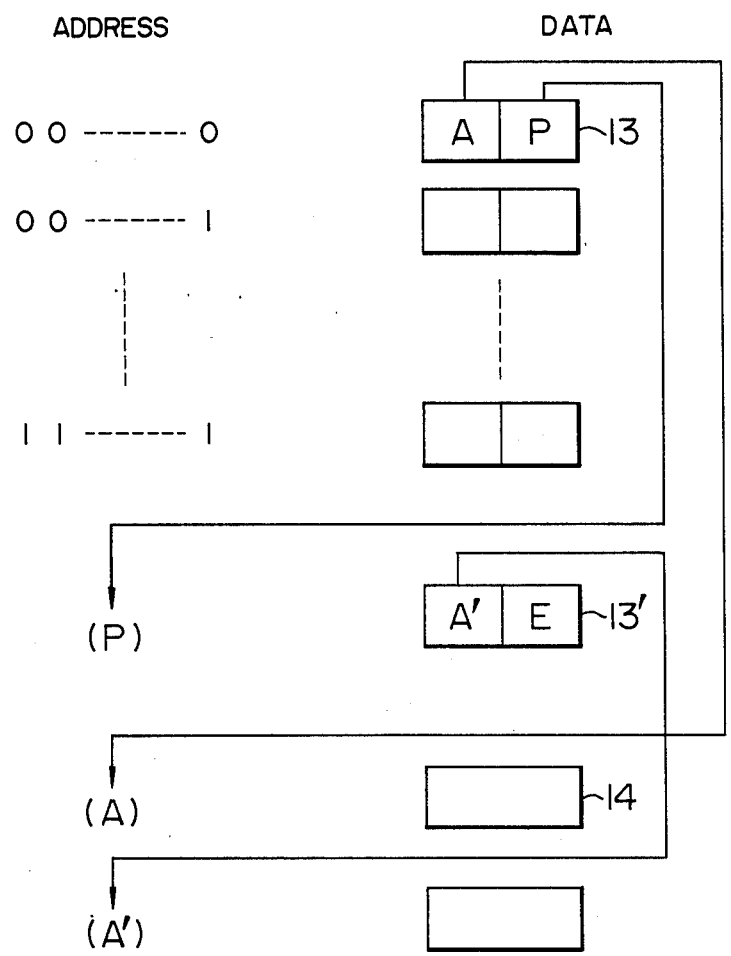
FIG. 2 is a view for illustrating a data structure adopted in a large-capacity file.

FIG. 2 shows, by way of example, a data structure in the large-capacity file 12. Assuming that the contents of the register 10 which holds the results of recognition made by the individual processors in a predetermined array may cover "00 . . . 0" to "11 . . . 11", there are stored at the addresses "00 . . . 0" to "11 . . . 1" information or data of the images or patterns which correspond to the results of recognitions, respectively. If the information or data is of a relatively small amount, all the data can be placed at the associated addresses. However, since the illustrated embodiment of the invention is intended to handle a large amount of data and deal with such situation in which a plurality of images or patterns are present for the same result of recognition, arrangement is made such that index data 13 each of which is composed of an address field A and a pointer field P are stored at the addresses "00 . . . 0" to "11 . . . 1", respectively, wherein actual data 14, each of which represents the image or pattern, is stored at the address designated by the address field A. On the other hand, the pointer P designates the address of other index data 13' also composed of the address field. A' and the pointer field for other objective for which the same result of recognition is to be produced. In this way, the data is chained until any other objective for which the same result of recognition is to be produced is no more present, whereupon an end code E is placed at the associated pointer field P. When data concerning a new image or pattern is to be placed in the file, the recognition of the pattern feature is performed with the aid of the apparatus shown in FIG. 1. Data or information resulting from the pattern recognition processings may be written in the register 10 at the addresses designated by the results of the recognitions or at the chained addresses.

By filing respective image or pattern data with the address location mentioned above, the access unit 11 can make use of the contents of the register 10 as the address data to search or retrieve readily and rapidly the data of the same feature pattern as the input image or pattern.

Figure 3:
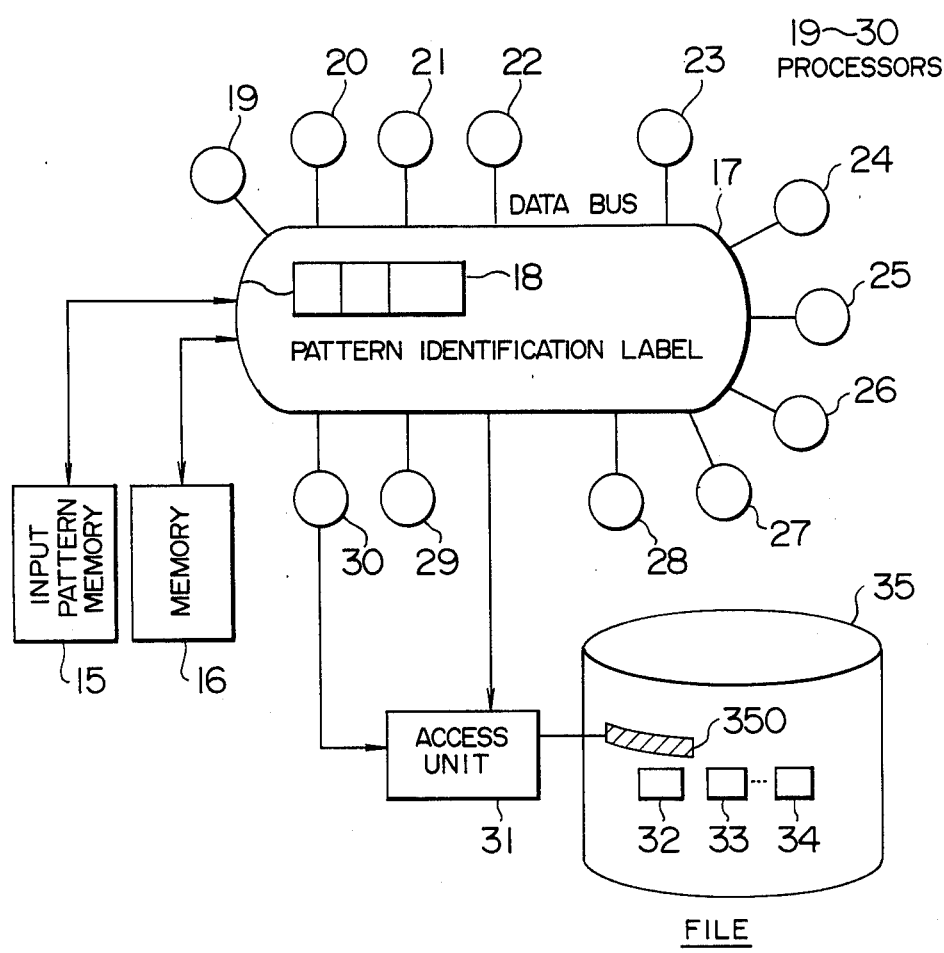
FIG. 3 shows a block diagram of another embodiment of the invention.

FIG. 3 shows in a block diagram another embodiment of the present invention which is so arranged that at least one of the feature pattern recognition processings is not performed independently but depends on the reslt of the processing performed by the other processor. An input pattern memory 15, an access unit 31 and a large-capacity file 35 are essentially the same as the memory 1, the access unit 11 and the large-capacity file 12 shown in FIG. 1. Further, the data structure in the large-capacity file is also substantially the same as the one illustrated in FIG. 2.

Figure 4:
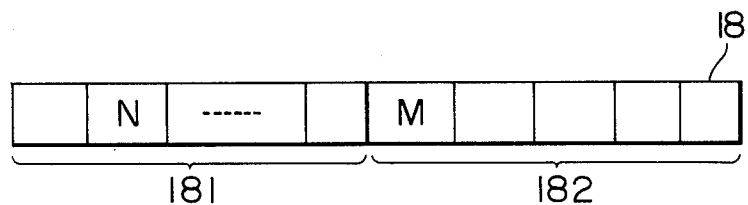
FIG. 4 is a view showing a format of a pattern identification label used in the apparatus shown in FIG. 3.

Processors 19, 20, ..., 29 are also similar to those shown in FIG. 1 in that they can individually access the memory 15 and that they are imparted with the capability to recognize the respective predetermined feature patterns. The processors 19, 20, ..., 29 are connected to a data bus 17 of a loop-like configuration through which a pattern identification label 18 flows for controlling the activation of the dependent feature pattern recognition processing. More specifically, reference is made to FIG. 4. The pattern identification label 18 is composed of a final pattern identification field 181 and an interim pattern identification field 182, wherein the final pattern identification field 181 corresponds to the register 10 shown in FIG. 1. A code for controlling the processor destined for performing the dependent recognition processing is placed in the interim pattern identification field 182. It is assumed, by way of example, that a given one of the processors 20, 21 and 22 is to be activated in dependence on the result of the processing performed by the processor 19. On this assumption, the processor 19 places one of the bit patterns "00", "01", "10" or "11" in an allocated area M of the interim pattern identification field 182 in dependence on the result of the processing performed by the processor 19. The processors 20, 21 and 22 monitor constantly that area M, whereby the processor 20 is activated when "01" is placed in the area M, the processor 21 is activated in response to "10" and the processor 22 is activated when "11" is present in the area M. In this manner, data-driven type processor activation control is realized. The result of the final pattern identifications issued by the individual processors are written in the respective allocated areas of the final pattern identification field 181 of the label 18, as in the case of the writing in the register 10 shown in FIG. 1. For example, the result of the final pattern identification performed by the processor 20 is written in the area N which is allocated to this processor 20. The memory 16 stores temporarily the results of the processings performed by the individual processors, when occasion requires.

Figure 5:
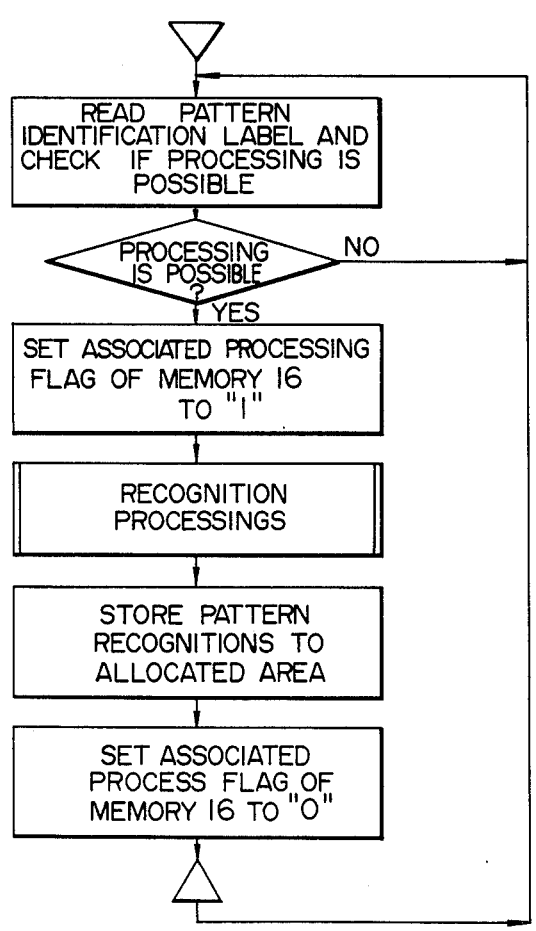
FIG. 5 is a flow chart for illustrating operations of individual processors of the apparatus shown in FIG. 3.

For checking whether or not the recognition processing has been completed for all the feature patterns, flag areas each of one bit are provided in the memory 16 for setting flags indicating the operating states of the processors, respectively. Each processor sets "1" at the assigned flag area upon initiation of the operation and resets the flag to "0" upon completion of the operation. To this end, a processor 30 is provided for monitoring the flag bits to make a decision as to the completion of the operations of the other processors. The processor 30 monitors the flag and supplies a command to the access unit 31 upon detection that all of the bits are "0". The access unit 31 responds to the command to receive the contents of the final pattern identification field 181 of the pattern identification label 18 as the addresses for accessing the large-capacity file 35 to read out the relevant information or data therefrom, as in the case of the access unit 1 shown in FIG. 1. The processings performed by the individual processors described above are summarized in a flow chart shown in FIG. 5. In the case of the illustrated embodiment, the data bus 17 of a loop-like configuration is employed for allowing the pattern identification label 18 to flow therethrough. However, it will be readily appreciated that the loop bus 17 may be replaced by a register arranged so that the individual processors can make access freely thereto.

As will be appreciated from the foregoing description, the present invention has now provided a data searching apparatus which responds to the input of image data such as a finger print, seal and/or constellation patterns and allows the rapid data searching of the large-capacity file for performing correlation, identification and/or acquisition of concerned data.

We claim:

1. An apparatus for searching pattern data for data having the same features as that of an input pattern data, comprising:
    a plurality of processing means operating independently of one another for recognizing individual feature patterns within said input pattern data and for outputting the results of recognition of said feature patterns;
    means for producing an address bit pattern according to the combination of the recognition results outputted from said respective processing means;
    file means for storing a plurality of pattern data to be searched, each of said pattern data having plural features and being stored at an address location having a predetermined relation to the combination of individual feature patterns within the respective pattern data; and
    access means for accessing said file means by using said address bit pattern directly as an access address of said file means thereby to read out the pattern data having the same features as that of said input pattern data identified by said recognition results.

2. An apparatus for searching pattern data according to claim 1, wherein
    said file means comprises a first storage region for storing a plurality of index data and a second storage region for storing a plurality of said pattern data, each of said index data including a first address value for indicating the location of corresponding pattern data in the second storage region and a second address value for indicating the location of another index data which designates another pattern data to be searched, and wherein
    said access means accesses said first storage region according to said address bit pattern and then accesses said second storage region according to the first address value of the accessed index data.

3. An apparatus for searching pattern data according to claim 1, wherein
    said address bit pattern producing means comprises register means for storing bit patterns representing the recognition results issued by said processing means at previously allocated locations thereof, respectively.

4. An apparatus for searching pattern data for data having the same features as that of an input pattern data, comprising:

a plurality of processing means in which at least one dependent processing means is activated in response to the result of the processing performed by the other independent processing means which operate independently of one another for recognizing individual feature patterns of input pattern data, respectively;

means for producing an address bit pattern according to the recognition results outputted from said respective processing means;

file means for storing a plurality of pattern data to be searched, each of said pattern data having plural features and being stored at an address location having a predetermined relation to the combination of individual feature patterns within the respective pattern data; and access means for accessing said file means by using said address bit pattern directly as an address of said file means thereby to read out the pattern data having the same features as that of said input pattern data identified by said recognition results.

5. An apparatus for searching pattern data according to claim 4, further comprising:

means for outputting a signal representing that respective recognition processings have been completed for all said processing means, said access means being activated in response to said signal.

6. An apparatus for searching pattern data for data having the same features as that of an input pattern data, comprising:

a plurality of processing means in which at least one dependent processing means is activated in response to the result of the processing performed by the other independent processing means which operate independently of one another for recognizing individual feature patterns of the input pattern data, respectively;

data bus means having a loop-like configuration for connecting said respective processing means and for transmitting a data frame having a plurality of data fields each of which is allocated to one of said processing means for storing a bit pattern representing the recognition result, respectively;

means for outputting a signal representing that respective recognition processings have been completed for all said processing means;

file means for storing a plurality of pattern data to be searched at locations of addresses having a predetermined relation to the combination of individual feature patterns within the respective pattern data; and means for accessing said file means by using the contents of said data frame directly as an address of said file means thereby to read out the pattern data having the same features as that of said input pattern data.

* * * * *